(12) United States Patent
Molnar et al.

(10) Patent No.: US 10,971,871 B2
(45) Date of Patent: Apr. 6, 2021

(54) CONNECTOR ADAPTATION WITH IMPEDANCE MATCHING

(71) Applicant: IXI Technology Holdings, Inc., Yorba Linda, CA (US)

(72) Inventors: Denes Molnar, Yorba Linda, CA (US); David Rodriguez, Ladera Ranch, CA (US)

(73) Assignee: IXI Technology Holdings, Inc., Yorba Linda, CA (US)

( * ) Notice: Subject to any disclaimer, the term of this patent is extended or adjusted under 35 U.S.C. 154(b) by 85 days.

(21) Appl. No.: 16/364,502

(22) Filed: Mar. 26, 2019

(65) Prior Publication Data

US 2020/0313370 A1    Oct. 1, 2020

(51) Int. Cl.
| | |
|---|---|
| *H01R 24/44* | (2011.01) |
| *H01R 31/06* | (2006.01) |
| *H01R 9/05* | (2006.01) |
| *H01R 24/64* | (2011.01) |
| *H01R 24/46* | (2011.01) |

(52) U.S. Cl.
CPC .......... *H01R 24/44* (2013.01); *H01R 9/0503* (2013.01); *H01R 24/46* (2013.01); *H01R 24/64* (2013.01); *H01R 31/065* (2013.01); *H01R 2201/04* (2013.01)

(58) Field of Classification Search
CPC ...... H01R 24/44; H01R 9/0503; H01R 24/46; H01R 24/64; H01R 31/065; H01R 2201/04; H01R 31/06; H01R 9/05
See application file for complete search history.

(56) References Cited

U.S. PATENT DOCUMENTS

| | | | | |
|---|---|---|---|---|
| 2002/0174423 A1* | 11/2002 | Fifield | ................... | H04N 7/104 725/1 |
| 2015/0215434 A1* | 7/2015 | Singh | .................... | H04L 45/741 370/467 |

* cited by examiner

*Primary Examiner* — Robert L Deberadinis
(74) *Attorney, Agent, or Firm* — The Watson IP Group, PLG; Jovan N. Jovanovic

(57) ABSTRACT

A method and apparatus utilize a data connector, a connection adapter, and a matching transformer. The data connector receives a data signal from a communication line. The connection adapter, coupled to the data connector, receives the data signal with the data connector, adapts the data signal from the data connector to a coax connector, and communicates the data signal to the coax connector. The matching transformer, coupled to a coax cable, performs impedance matching between a first impedance associated with the coax connector and a second impedance associated with the coax cable communicating the data signal.

20 Claims, 4 Drawing Sheets

US 10,971,871 B2

CONNECTOR ADAPTATION WITH IMPEDANCE MATCHING

BACKGROUND OF THE DISCLOSURE

1. Field of the Disclosure

The disclosure relates in general to protocol adaptation, and more particularly, to protocol adaptation with impedance matching.

2. Background Art

On ships currently fielded by the US and other foreign navies, legacy cabling is present to allow communication between systems through watertight compartments and bulkheads. This legacy cabling is extremely expensive and difficult to change out. Examples of such legacy cabling include cabling conformed to the MIL-STD-1397C specification that allows for a low-speed connection, parallel data transfer of up to 250,000 words per second on one cable, between systems using triaxial based cabling schemes. Other legacy low-speed cabling specifications used by navies includes MIL-STD-1553 using twinax cabling and IRIG STANDARD 200-16 using coax cabling.

SUMMARY OF THE DISCLOSURE

The disclosure is directed to an apparatus comprised of a data connector, a connection adapter, and a matching transformer. The data connector receives a data signal from a communication line. The connection adapter, coupled to the data connector, receives the data signal with the data connector, adapts the data signal from the data connector to a coax connector, and communicates the data signal to the coax connector. The matching transformer, coupled to a coax cable, performs impedance matching between a first impedance associated with the coax connector and a second impedance associated with the coax cable communicating the data signal.

It is contemplated that the first impedance is 75 ohms and the second impedance is 50 ohms.

It is contemplated that the first impedance is 75 ohms and the second impedance is 77 ohms.

It is contemplated that the connection adapter further performs protocol conversion on the data signal to convert the data signal from a first protocol to a second protocol, the first protocol being the Internet Protocol (IP) and the second protocol being the Multimedia over Coax Alliance (MoCA) protocol.

It is contemplated that the data connector is an RJ45 Ethernet connector and the communication line is an Ethernet cable.

It is contemplated that the apparatus is further comprised of a SubMiniature A (SMA) connector coupling the matching transformer to the coax cable.

It is contemplated that a system comprises the apparatus, the system comprising at least one of a network switch and a network router coupled to the data connector, the at least one of the network switch and the network router coupling the apparatus to a plurality of computing equipment.

It is contemplated that the network router is a Wi-Fi network router.

It is contemplated that the coax cable is one of a single coax cable, a twinax cable, and a triax cable.

It is contemplated that a system comprises the apparatus, the system comprising a switch to switch the coax cable from being used for a MIL-STD protocol to the coax cable being used for a Multimedia over Coax Alliance (MoCA) protocol.

The disclosure is also directed to a method comprising receiving, with a data connector, a data signal from a communication line and adapting, with a connection adapter, the data signal from the data connector to a coax connector. The method further comprises impedance matching, with a matching transformer, between a first impedance associated with the coax connector and a second impedance associated with a coax cable communicating the data signal.

It is contemplated that the first impedance of the method is 75 ohms and the second impedance is 50 ohms.

It is contemplated that the first impedance of the method is 75 ohms and the second impedance is 77 ohms.

It is contemplated that the method further comprises performing, with the connection adapter, protocol conversion on the data signal to convert the data signal from a first protocol to a second protocol, the first protocol being the Internet Protocol (IP) and the second protocol being a Multimedia over Coax Alliance (MoCA) protocol.

It is contemplated that the data connector of the method is an RJ45 Ethernet connector and the communication line is an Ethernet cable.

It is contemplated that the method further comprises coupling, with a SubMiniature A (SMA) connector, a matching transformer performing the impedance matching to the coax cable.

It is contemplated that the method further comprises coupling the connection adapter to at least one of a network switch and a network router, the at least one of the network switch and the network router coupling the connection adapter to a plurality of computing equipment.

It is contemplated that the network router of the method is a Wi-Fi network router.

It is contemplated that the coax cable of the method is one of a single coax cable, a twinax cable, and a triax cable.

It is contemplated that the method further comprises switching the coax cable from being used for a MIL-STD protocol to the coax cable being used for a Multimedia over Coax Alliance (MoCA) protocol.

BRIEF DESCRIPTION OF THE DRAWINGS

The disclosure will now be described with reference to the drawings wherein.

DETAILED DESCRIPTION OF THE DISCLOSURE

Figure 1:
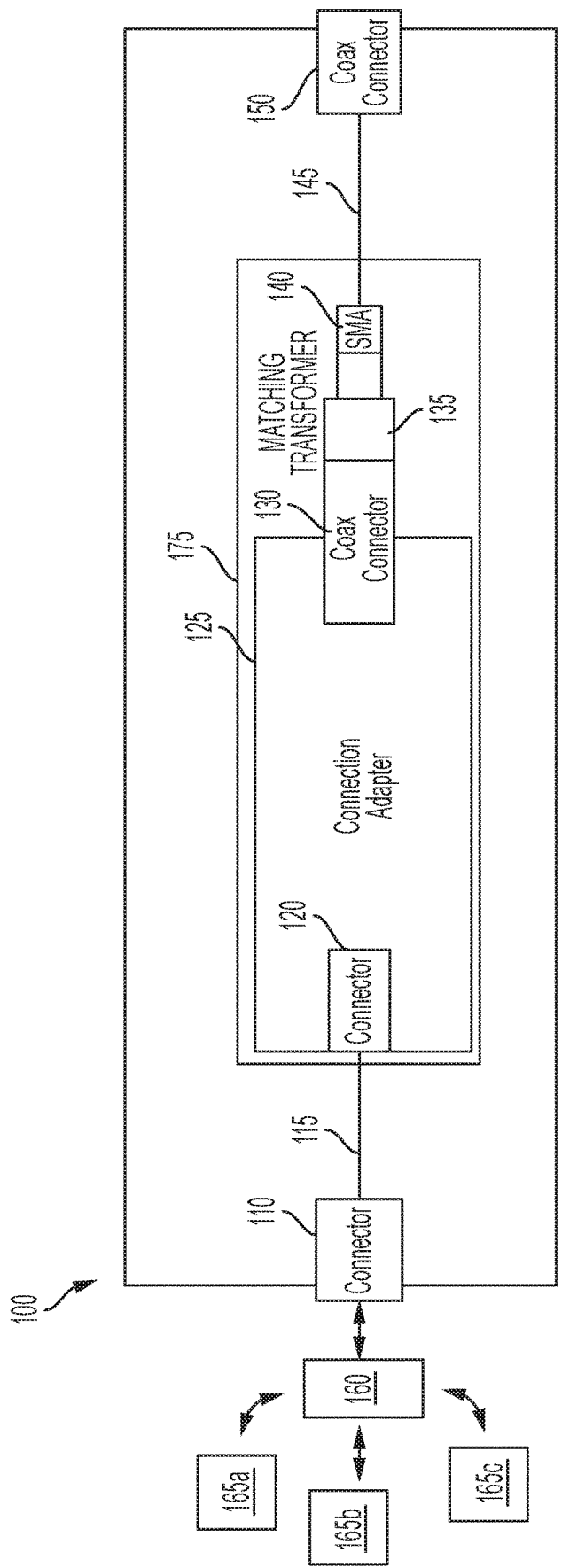
FIG. 1 illustrates an example data system that adapts a data signal received with one type of connector to another type of connector, in accordance with the embodiments disclosed herein.

While this disclosure is susceptible of embodiment(s) in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, a data system 100 is disclosed that adapts a data signal received with one type of connector to another type of connector. The data system 100 includes a first data connector 110, a communication line 115, a second data connector 120, a connection adapter 125, a first coax connector 130, a matching transformer 135, a SubMiniature A (SMA) connector 140, a legacy coax cable 145, and a second coax connector 150. In an example embodiment, an apparatus 175 can include the second data connector 120, the connection adapter 125, the first coax connector 130, the matching transformer 135, and the SMA connector 140.

In use, the first data connector 110 receives a data signal, such as a high-speed data signal (10+ Mbit/s). In at least one embodiment, the first data connector 110 is a high-speed connector, such as an RJ45 Ethernet connector and the data signal is the Internet Protocol (IP) data signal. The first data connector 110 is coupled to the communication line 115 that communicates the received data signal to the second data connector 120. In at least one embodiment, the communication line 115 is an Ethernet cable, such as a Category 5 (Cat5), Cat6, or Cat7 cable. In at least one embodiment, the second data connector 120 is also an RJ45 Ethernet connector, although other high-speed connector types are possible without departing from the scope of the embodiments.

The connection adapter 125 is coupled to the second data connector 120, for example another high-speed connector. The connection adapter 125 is further coupled to the first coax connector 130, the first coax connector 130 receiving the data signal. Thus, in an example the connection adapter 125 receives the data signal with a first connector type, an Ethernet connector, and communicates the data signal with a second connector type, a coax connector. In accordance with at least one embodiment, the connection adapter 125 also performs protocol conversion on the data signal, that is converts protocol associated with the data signal from a first protocol to a second protocol without changing user data or a payload associated with the data signal. For example, the connection adapter 125 converts the data signal from the IP protocol received on the second data connector 120 to a Multimedia over Coax Alliance (MoCA) protocol, e.g., any of versions 1.0 through 2.5, 100 Mbit/s to 2.5 Gbit/s, respectively, that allow for high-speed communication over single coaxial cable, with options for even higher speeds with multiple channels on the same cable when utilizing bonded devices. Future versions of the MoCA specification will apply as well to the embodiments disclosed herein without departing from the scope of the embodiments.

The matching transformer 135 is coupled to the first coax connector 130, for example a high-speed connector. The matching transformer 135 converts use of the connection adapter 125 to another impedance such that the connection adapter 125 can be utilized with the coax cable 145 allowing the data signal to be communicated over the coax cable 145. This impedance matching introduces minimal noise into this connection. That is the matching transformer 135 performs impedance matching between a first impedance associated with the second coax connector 120 and a second impedance associated with the coax cable 145. In at least one embodiment, the matching transformer 135 is further coupled to a SubMiniature A (SMA) connector 140 coupling the matching transformer 135 to the coax cable 145, the SMA connector 140 receiving the data signal in the second protocol. The coax cable 145 is further coupled to the second coax connector 150 that receives the data signal in the second protocol. The coax cable 145 can be a single coax cable, a twinax cable, or a triax cable. In an example, the system 100 can utilize multiple connections adapters 175, one for each of the coax cables within the twinax cable and the triax cable to further increase high-speed bandwidth between the plurality of computing equipment 165a, 165b, 165c and the coax connector 150.

The original MIL-STD-1397C specifies a less commonly used serial interface called Type D. This Type D interface uses a 75 ohms coaxial cable, similar to cables used in homes. In this scenario in which the coax cable 145 is such a 75 ohms coaxial cable and the second protocol is the MoCA protocol, the matching transformer 135 in at least one embodiment is optional and excluded from the apparatus 175 for performing impedance matching between the MoCA 75 ohms specification and the MIL-STD-1397C 75 ohms specification. In this scenario the SMA 140 is also optional and excluded from the apparatus 175. The MIL-STD-1553 specification uses twinax cabling for communications with 77 ohms impedance. In this scenario in which the coax cable 145 is such a 77 ohms twinax cable, the matching transformer 135 performs impedance matching between the MoCA 75 ohms specification and the MIL-STD-1553 77 ohms specification. Another serial interface used on ships that benefits from the embodiments disclosed herein is the IRIG STANDARD 200-16 that commonly utilizes a 50 ohms coaxial cable. In this scenario in which the coax cable 145 is such a 50 ohms coaxial cable, the matching transformer 135 performs impedance matching between the MoCA 75 ohms specification and the TRIG STANDARD 200-16 50 ohms specification.

In accordance with the embodiments disclosed herein, although the discussion above describes signaling as being communicated from the first data connector 110 to the second coax connector 150, via the components described therebetween, one skilled in the art would appreciate that the data signaling can also traverse the data system 100 in the opposite direction. Additionally, in accordance with the embodiments disclosed herein, although the discussion above describes signaling as being communicated from the first data connector 110 to the second coax connector 150, via the components described therebetween, data signaling can also simultaneously traverse the data system 100 in the opposite direction. Thus, signaling can be communicated simultaneously from the second coax connector 150 to the first data connector 110, via the components described therebetween. In such an embodiment, the data system 100 is bi-directional. As MoCA also sends data bi-directionally while the original MIL-STD-1397C specification only allows for data to be sent in one direction per each cable, the apparatus 175 utilizing MoCA effectively halves the number of cables required for bi-directional communication between computing systems on ships.

Depending upon the configuration of the data system 100, the data system 100 can further include use of a network device 160, such as a network switch or a network router. In some embodiments, the network router is a Wi-Fi network router. The network device 160 allows a plurality of computing equipment 165a, 165b, 165c with one another and to communicate with at least one other computing equipment (not shown) via the data system 100. In the case of the network device 160 being a Wi-Fi network router, Wi-Fi allows un-cabled devices to communicate even between bulkheads as well over the Wi-Fi network router via the coax cable 145.

Thus, the data system 100 solves the problem of allowing modern high-speed systems with modern high-speed communication interfaces to communicate with one another using legacy existing cabling designed for low-speed communication, such as legacy existing cabling onboard ships. This allows systems, such as those onboard ships, to be upgraded without removing the legacy existing cabling resulting in huge cost savings. In addition, existing cabling, such as coaxial, twinaxial, and triaxial cabling, that are/were being used onboard ships for such purposes as communicating video information and/or audio information, such as analog video information and/or analog audio information, can be repurposed to the high-speed communications disclosed herein in accordance with one or more of the embodiments.

Figure 2:
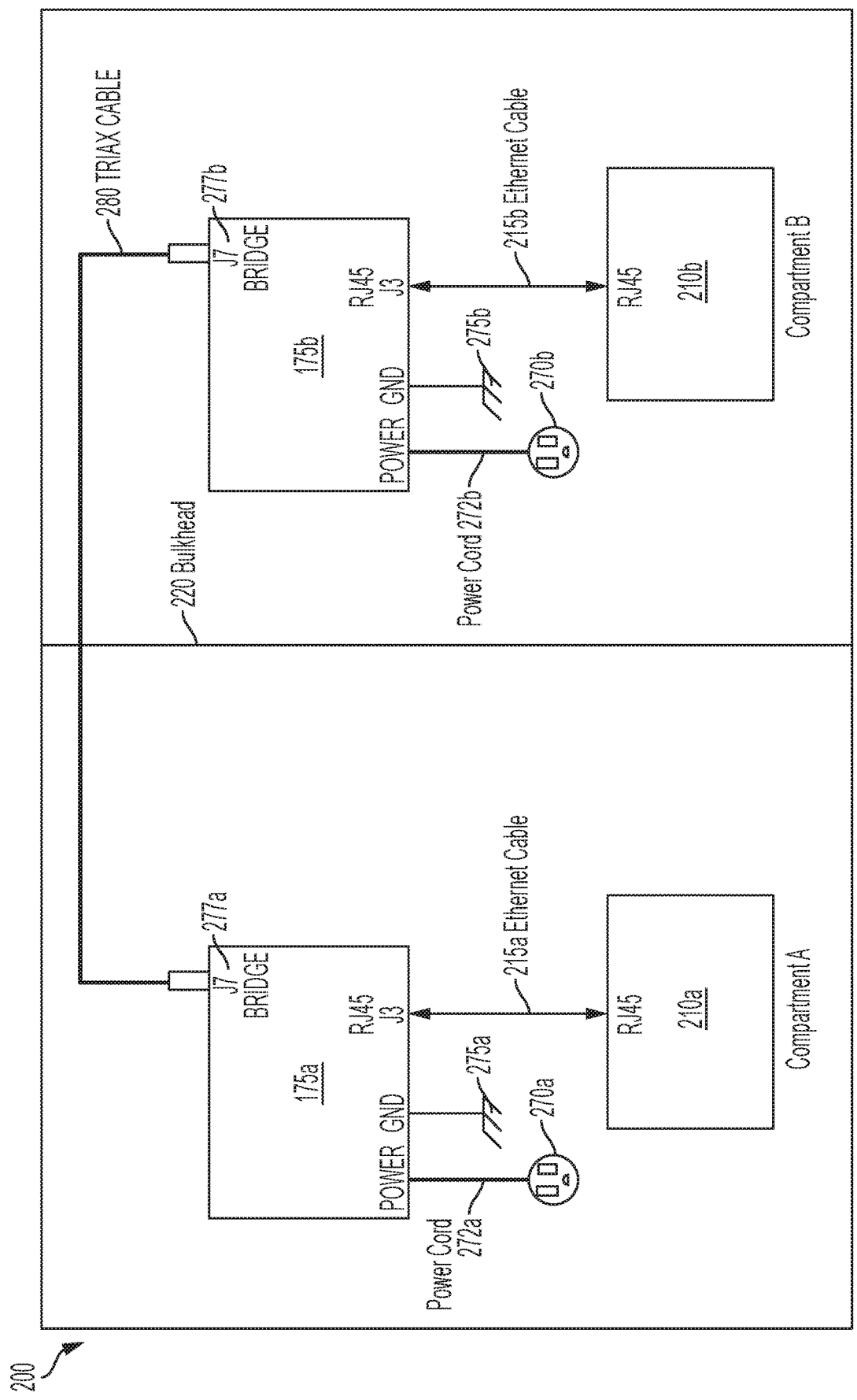
FIG. 2 illustrates another example data system that utilizes two connection adapters to establish communicates between two computing devices, such as personal computers, in accordance with the embodiments disclosed herein.

FIG. 2 illustrates another data system 200 that utilizes two connection adapters 175a, 175b to establish communicates between two computing devices 210a, 210b, such as personal computers. In this example embodiment, two pieces of computing equipment present in different compartments are shown as communicating over Ethernet by way of the conversion to triaxial cable that runs through bulkheads, such as those present on ships.

In particular, the data system 200 includes a first compartment, compartment A, and a second compartment, compartment B, compartment A and compartment B shown as being separated by a bulkhead 220. Within compartment A is shown a first computing equipment 210a coupled to a first connection adapter 175a via a first Ethernet cable 215a. Each of the first computing equipment 210a and the first connection adapter 175a includes an RJ45 jack to each couple to the first Ethernet cable 215a. The first connection adapter 175a is shown as being coupled to a first electrical outlet 270a via a first power cord 272a and also to an electric ground 275a.

Within compartment B is shown a second computing equipment 210b coupled to a second connection adapter 175b via a second Ethernet cable 215b. Each of the second computing equipment 210b and the second connection adapter 175b includes an RJ45 jack to each couple to the second Ethernet cable 215b. The second connection adapter 175b is shown as being coupled to a second electrical outlet 270b via a second power cord 272b and also to an electric ground 275b. In this embodiment, the first connection adapter 175a and the second connection adapter 175b are coupled via a legacy triax cable 280. The first connection adapter 175a and the second connection adapter 175b each include a bridge jack, 177a, 177b, respectively, to couple the first connection adapter 175a and the second connection adapter 175b to the triax cable 280.

In an embodiment, the triax cable 280 is disposed within both compartment A and compartment B and passes through the bulkhead 220. The triax cable 280 is existing legacy cabling within a ship that was originally designed for low-speed communication. However, with use of the first connection adapter 175a and the second connection adapter 175b the triax cable 280 is now able to service high-speed communications between the first computing equipment 210a and the second computing equipment 210b. Thus, with utilization of the first connection adapter 175a and the second connection adapter 175b communications between compartment A and compartment B have been upgraded from low-speed communications to high-speed communications without removing and replacing the triax cable 280.

Figure 3:
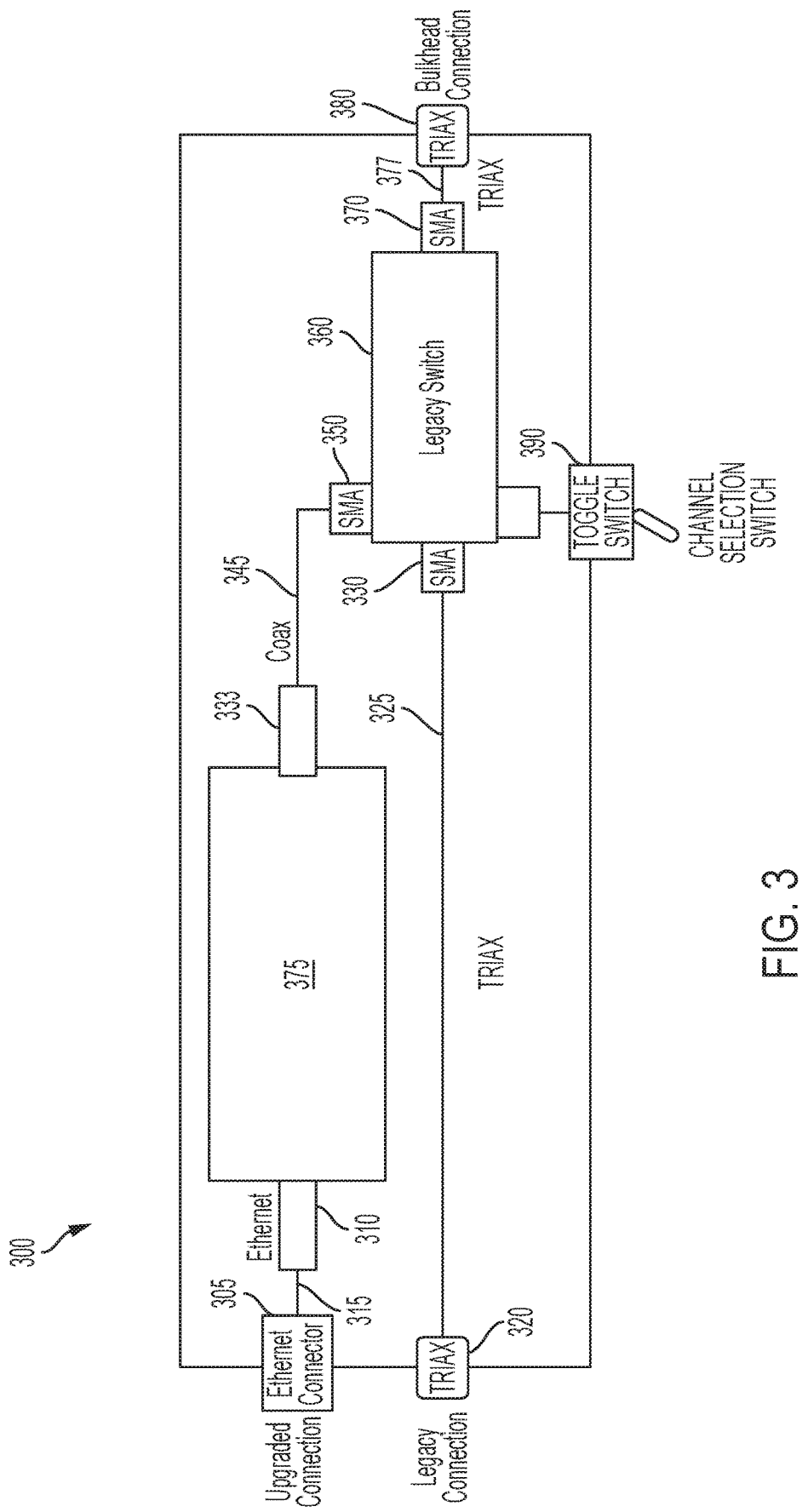
FIG. 3 illustrates yet another example data system that supports both a newer high-speed device as well as an older legacy device, in accordance with the embodiments disclosed herein.

FIG. 3 illustrates yet another data system 300 that supports both a newer high-speed device (not shown) as well as an older legacy device (not shown). There are situations where a connection from both a legacy device and an upgraded device would be useful, the connection being switched between bulkheads without reconnecting equipment connected thereto, respectively. To achieve such a switched connection, the data system 300 includes a legacy switch 360 that switches the data system 300 from servicing the newer high-speed device and the older legacy device.

The data system 300 includes a first Ethernet connector 305, an Ethernet cable 315, a second Ethernet connector 310, a connection adapter 375, a coax connector 333, a coax cable 345, triax connector 320, a legacy first triax cable 325, a first SMA connector 330, a second SMA connector 350, a legacy switch 360, a third SMA connector 370, a legacy second triax cable 377, a second triax connector 380, and a switch 390 (e.g., a toggle switch).

The first Ethernet connector 305 is coupled to the Ethernet cable 315 that is also coupled to the second Ethernet connector 310. In at least one embodiment, the first Ethernet connector 305 and the second Ethernet connector 310 are high-speed connectors, such as an RJ45 Ethernet connector. The second Ethernet connector 310 is also coupled to the connection adapter 375. The connection adapter 375 is also coupled to the first coax connector 333 that is also coupled to the coax cable 345. The coax cable 345 is also coupled to the second SMA connector 350.

The first triax connector 320 is coupled to the triax cable 325. The triax cable 325 is also coupled to a first SMA connector 330, the first SMA connector 330 also being coupled to the legacy switch 360. The legacy switch 360 is also coupled to a second SMA connector 350 and a third SMA connector 370. The second SMA connector 350 couples the legacy switch 360 to the connection adapter 375 and the third SMA connector 370 couples the legacy switch 360 to the triax cable 377 that is coupled to a second triax connector 380. In at least one embodiment, the second triax connector 380 serves as a bulkhead connection aboard a ship.

In use, the connection adapter 375 performs the functions as described above for the connection adapter 175. Depending upon the configuration of the switch 390, the legacy switch 360 communicates either a high-speed data signal received from the second SMA connector 350 or a legacy low-speed data signal received from either the first SMA connector 330 and the third SMA connector 370, via the first triax connector 320 and the second triax connector 380, respectively.

In an example embodiment in which the connection adapter 375 performs protocol conversion, in response to the switch 390 being in a first configuration the legacy switch 360 communicates the data signal in a second protocol, after having converted the data signal from a first protocol, on the first triax cable 325 and the second triax cable 377. In response to the switch 390 being in a second configuration, the legacy switch 360 communicates the legacy low-speed data signal on the first triax cable 325 and the second triax cable 377. As shown in FIG. 2, a second connection adapter (not shown) is used to convert the high-speed data signal from that being communicated over the coax cable 345 and at least one of the first triax cable 325 and the second triax cable 377, back to another Ethernet connection (not shown).

Figure 4:
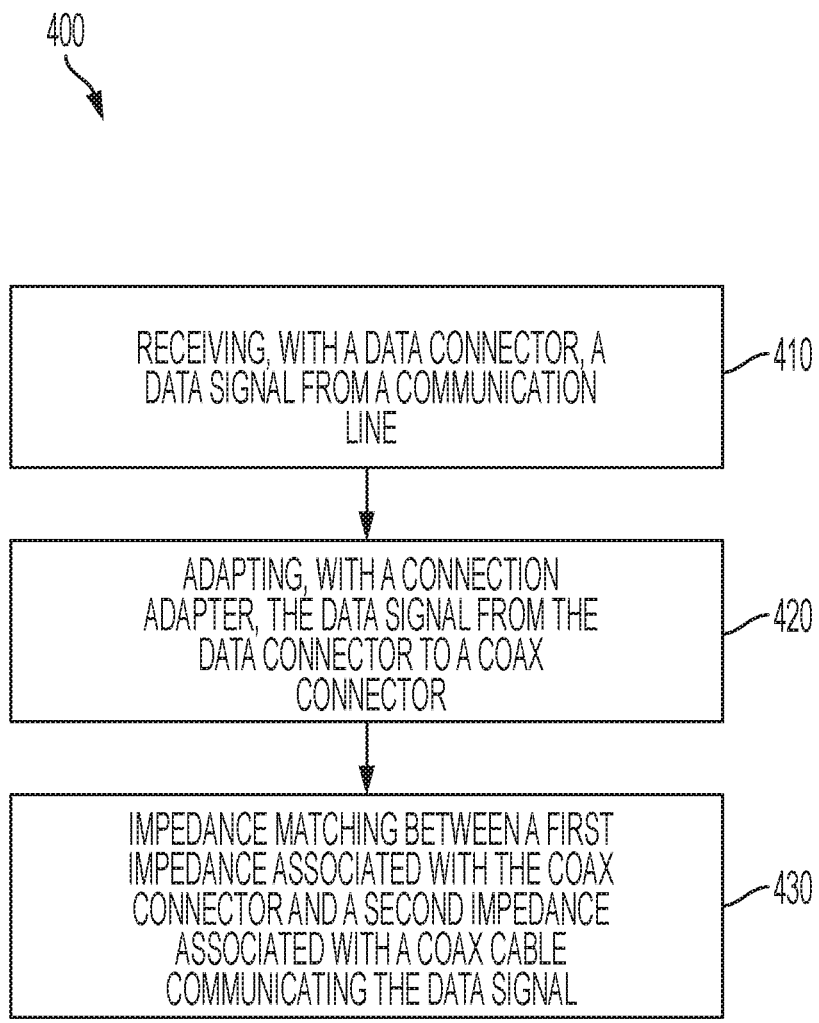
FIG. 4 illustrates an example flowchart for a method of communicating the data signal.

FIG. 4 illustrates a flowchart for a method 400 of communicating the data signal. For example, the method 400 can begin with operation 410 that includes receiving, with a data connector, a data signal from a communication line. In an example, the data connector is the second data connector 120 and the communication line is the communication line 115. In an example, the data connector is an RJ45 Ethernet connector and the communication line is an Ethernet cable.

Operation 410 proceeds to operation 420. Operation 420 includes adapting, with a connection adapter, the data signal received in operation 410 from the data connector to a coax connector. In an example, the connection adapter is the connection adapter 125 and the coax connector is the first coax connector 130. In at least one embodiment, operation 430 further includes performing, with the connection adapter, protocol conversion on the data signal to convert the data signal from a first protocol to a second protocol, the first protocol being the Internet Protocol (IP) and the second protocol being a Multimedia over Coax Alliance (MoCA) protocol.

Operation 420 proceeds to operation 430. Operation 430 includes impedance matching between a first impedance associated with the coax connector and a second impedance associated with a coax cable communicating the data signal. In an example, the impedance matching is performed by the connection adapter 125 and the coax cable is the coax cable 145. In at least one embodiment, the first impedance of operation 430 is 75 ohms and the second impedance is 50 ohms. In at least one embodiment, the first impedance of operation 430 is 75 ohms and the second impedance is 77 ohms. In at least one embodiment, operation 430 further includes coupling, with a SubMiniature A (SMA) connector, a matching transformer performing the impedance matching, to the coax cable. In at least one embodiment, operation 430 further includes coupling the connection adapter to at least one of a network switch and a network router, the at least one of the network switch and the network router coupling the connection adapter to a plurality of computing equipment, such as the plurality of computing equipment 165a, 165b, 165c. In an example, the network router is a Wi-Fi network router. In an example, the coax cable is one of a single coax cable, a twinax cable, and a triax cable.

In at least one embodiment, the method 400 further includes switching the coax cable from being used for a MIL-STD protocol to the coax cable being used for a Multimedia over Coax Alliance (MoCA) protocol. In an example, the legacy switch 360 is performs this switching.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An apparatus, comprising:
    a data connector to receive a data signal from a communication line;
    a connection adapter, coupled to the data connector, to receive the data signal with the data connector, adapt the data signal from the data connector to a coax connector, and communicate the data signal to the coax connector; and
    a matching transformer, coupled to a legacy coax cable onboard a ship, to perform impedance matching between a first impedance associated with the coax connector and a second impedance associated with the legacy coax cable communicating the data signal.

2. The apparatus according to claim 1, wherein the first impedance is 75 ohms and the second impedance is 50 ohms.

3. The apparatus according to claim 1, wherein the first impedance is 75 ohms and the second impedance is 77 ohms.

4. The apparatus according to claim 1, wherein the connection adapter further performs protocol conversion on the data signal to convert the data signal from a first protocol to a second protocol, the first protocol being the Internet Protocol (IP) and the second protocol being a Multimedia over Coax Alliance (MoCA) protocol.

5. The apparatus according to claim 1, wherein the data connector is an RJ45 Ethernet connector and the communication line is an Ethernet cable.

6. The apparatus according to claim 1, further comprising a SubMiniature A (SMA) connector coupling the matching transformer to the legacy coax cable.

7. The apparatus according to claim 1, wherein a system comprises the apparatus, the system comprising at least one of a network switch and a network router coupled to the data connector, the at least one of the network switch and the network router coupling the apparatus to a plurality of computing equipment.

8. The apparatus according to claim 7, wherein the network router is a Wi-Fi network router.

9. The apparatus according to claim 1, wherein the legacy coax cable is one of a single coax cable, a twinax cable, and a triax cable.

10. The apparatus according to claim 1, wherein a system comprises the apparatus, the system comprising a switch to switch the legacy coax cable from being used for a MIL-STD protocol to the legacy coax cable being used for a Multimedia over Coax Alliance (MoCA) protocol.

11. A method, comprising:
    receiving, with a data connector, a data signal from a communication line;
    adapting, with a connection adapter, the data signal from the data connector to a coax connector; and
    impedance matching, with a matching transformer, between a first impedance associated with the coax connector and a second impedance associated with a legacy coax cable onboard a ship communicating the data signal.

12. The method according to claim 11, wherein the first impedance is 75 ohms and the second impedance is 50 ohms.

13. The method according to claim 11, wherein the first impedance is 75 ohms and the second impedance is 77 ohms.

14. The method according to claim 11, further comprising performing, with the connection adapter, protocol conversion on the data signal to convert the data signal from a first protocol to a second protocol, the first protocol being the Internet Protocol (IP) and the second protocol being a Multimedia over Coax Alliance (MoCA) protocol.

15. The method according to claim 11, wherein the data connector is an RJ45 Ethernet connector and the communication line is an Ethernet cable.

16. The method according to claim 11, further comprising coupling, with a SubMiniature A (SMA) connector, a matching transformer performing the impedance matching to the legacy coax cable.

17. The method according to claim 11, further comprising coupling the connection adapter to at least one of a network switch and a network router, the at least one of the network switch and the network router coupling the connection adapter to a plurality of computing equipment.

18. The method according to claim 15, wherein the network router is a Wi-Fi network router.

19. The method according to claim 11, wherein the legacy coax cable is one of a single coax cable, a twinax cable, and a triax cable.

20. The method according to claim 11, further comprising switching the legacy coax cable from being used for a MIL-STD protocol to the legacy coax cable being used for a Multimedia over Coax Alliance (MoCA) protocol.

\* \* \* \* \*